United States Patent
Petrou et al.

(10) Patent No.: US 10,346,493 B1
(45) Date of Patent: *Jul. 9, 2019

(54) ON-DEVICE QUERY REWRITING

(71) Applicant: Google LLC, Mountain View, CA (US)

(72) Inventors: David Petrou, Brooklyn, NY (US); Matthew Sharifi, Kilchberg (CH)

(73) Assignee: Google LLC, Mountain View, CA (US)

( * ) Notice: Subject to any disclaimer, the term of this patent is extended or adjusted under 35 U.S.C. 154(b) by 42 days.

This patent is subject to a terminal disclaimer.

(21) Appl. No.: 15/595,019

(22) Filed: May 15, 2017

Related U.S. Application Data

(63) Continuation of application No. 15/091,193, filed on Apr. 5, 2016, now Pat. No. 9,684,693.

(51) Int. Cl.
  *G06F 17/30* (2006.01)
  *G06F 16/9535* (2019.01)
  *G06F 16/9032* (2019.01)

(52) U.S. Cl.
  CPC ...... *G06F 16/9535* (2019.01); *G06F 16/9032* (2019.01)

(58) Field of Classification Search
  CPC ......... G06F 17/30867; G06F 17/30967; G06F 17/30522; G06F 17/30448; G06F 16/9535; G06F 16/9032; G06F 16/335; G06F 16/337; G06F 16/432; G06F 17/30525; G06F 17/30554; G06F 17/30864
  USPC ................ 707/706, 759, 765, 768, 769, 771
  See application file for complete search history.

(56) References Cited

U.S. PATENT DOCUMENTS

| | | | |
|---|---|---|---|
| 7,761,439 B1 | 7/2010 | Auerbach | |
| 9,183,257 B1 | 11/2015 | Buchanan et al. | |
| 2007/0276801 A1* | 11/2007 | Lawrence | G06F 17/30867 |
| 2012/0259826 A1 | 10/2012 | Zaila-Wenkstern | |
| 2012/0278399 A1 | 11/2012 | Turner | |
| 2013/0110827 A1* | 5/2013 | Nabar | G06F 17/30867 |
| | | | 707/728 |
| 2013/0262127 A1* | 10/2013 | Goldstein | G10L 13/033 |
| | | | 704/278 |
| 2013/0290106 A1* | 10/2013 | Bradley | G06Q 90/20 |
| | | | 705/14.64 |

(Continued)

OTHER PUBLICATIONS

Written Opinion issued in International Application No. PCT/US2016/066496, dated Mar. 28, 2018, 8 pages.

(Continued)

*Primary Examiner* — Hares Jami
(74) *Attorney, Agent, or Firm* — Fish & Richardson P.C.

(57) ABSTRACT

Methods, systems, and apparatus, including computer programs encoded on a computer storage medium, relating to on-device query annotating. In some implementations, a search query is received, and a mobile device identifies a reference to a particular entity and a reference to a category based on the query. A model that is stored on the mobile device and stores one or more facts that are associated with one or more entities is accessed. A subset of facts from among the facts that are stored in the model for the particular entity is selected. The search query is annotated based at least on one or more facts of the subset of facts that are stored in the model for the particular entity. The annotated search query is transmitted, from the mobile device to a search engine, for processing. A result of processing the annotated search query is received by the mobile device.

20 Claims, 4 Drawing Sheets

(56) References Cited

U.S. PATENT DOCUMENTS

2014/0006517 A1   1/2014  Hsiao
2015/0379079 A1  12/2015  Kota
2016/0078086 A1   3/2016  Nowak-Przygodzki et al.
2016/0092508 A1   3/2016  Ivchenko
2017/0012987 A1   1/2017  Gupta

OTHER PUBLICATIONS

International Preliminary Report on Patentability issued in International Application No. PCT/US2016/066496, dated Jun. 25, 2016, 9 pages.
Calegari et al. "Personalized Ontology-Based Query Expansion," IEEE/WIC/ACM International Conference on Web Intelligence and Intelligent Agent Technology, Dec. 9, 2008, 4 pages.
International Search Report and Written Opinion issued in International Application No. PCT/US2016/066496, dated Aug. 21, 2017, 16 pages.
Wu et al. "A Study of Ontology-based Query Expansion," Technical Report CS-2011-04, Feb. 9, 2011, 38 pages.

\* cited by examiner

ON-DEVICE QUERY REWRITING

CROSS-REFERENCE TO RELATED APPLICATION

This application is a continuation of U.S. application Ser. No. 15/091,193, filed Apr. 5, 2016, the contents of which are incorporated by reference.

FIELD

This specification relates to search engines.

BACKGROUND

Web searches from mobile devices have become increasingly standard over the past years. Web search engines attempt to rank results to given search queries in the most relevant order. Typically, a query is annotated or rewritten prior to processing, for example to include additional query terms, such as synonyms, that were not present in the original query, or to otherwise place the query in better condition for processing by the search engine.

SUMMARY

In order to make search more assistive, a search engine should have a good understanding of the user issuing a query. For example, the query "where to have dinner with David" may be meaningless to a server-side search engine unless the search engine has detailed information about the user and their contacts. Mobile devices often have more user-specific knowledge than a server-side search engine. This knowledge may come from what a user has previously typed, what he has seen on-screen, or what is in his current environment.

According to one general implementation, mobile search queries may be rewritten on a client device, using extended knowledge available to that device. This extended knowledge may be derived based on a user's previous text entry, on-screen information, device sensors, etc. The extended knowledge allows the server-side assistant to operate with a much better understanding of the user. Query rewriting may be enhanced by the selective inclusion of additional data, such as private information related to entities and categories indicated by a query, that the user has indicated may be shared with the search engine.

In one general aspect, a method performed by one or more computers includes: receiving, at a mobile device, a search query; identifying, by the mobile device and based on the search query, a reference to a particular entity, and a reference to a category; accessing, by the mobile device, a model that is stored on the mobile device, and, for each of one or more entities, stores one or more facts that are associated with the entity; selecting, by the mobile device, a subset of facts from among the facts that are stored in the model for the particular entity, based at least on the category; annotating, by the mobile device, the search query based at least on one or more facts of the subset of facts that are stored in the model for the particular entity; transmitting, from the mobile device to a search engine, the annotated search query for processing; and receiving, by the mobile device and from the search engine, a result of processing the annotated search query.

Implementations may include one or more of the following features. For example, the method may further include identifying, by the mobile device and based on the search query, (i) a reference to a particular entity, and (ii) a reference to a category may include annotating the search query. Annotating, by the mobile device, the search query based at least on one or more facts of the subset of facts that are stored in the model for the particular entity may be done by an on-device query rewrite engine of the mobile device. Selecting, by the mobile device, a subset of facts from among the facts that are stored in the model for the particular entity, based at least on the category may be done through machine learning. The reference to the particular entity may be implicit. Selecting, by the mobile device, a subset of facts from among the facts that are stored in the model for the particular entity, based at least on the category, may be done based at least on a rule set. The method may further include identifying, by the mobile device and from the search query, one or more query terms and the referenced category; processing, by the mobile device, the one or more query terms and the referenced category to determine a fact type relevant to the search query; and selecting, by the mobile device, a subset of facts from among the facts that are stored in the model for the particular entity, based at least on the category and the fact type. The method may further include removing, by the mobile device, private information associated with the one or more facts of the subset of facts prior to the transmission of the annotated search query to the search engine.

In another general aspect, at least one computer-readable storage medium encoded with executable instructions that, when executed by at least one processor, cause the at least one processor to perform operations including: receiving, at a mobile device, a search query; identifying, by the mobile device and based on the search query, (i) a reference to a particular entity, and (ii) a reference to a category; accessing, by the mobile device, a model that (i) is stored on the mobile device, and, (ii) for each of one or more entities, stores one or more facts that are associated with the entity; selecting, by the mobile device, a subset of facts from among the facts that are stored in the model for the particular entity, based at least on the category; annotating, by the mobile device, the search query based at least on one or more facts of the subset of facts that are stored in the model for the particular entity; transmitting, from the mobile device to a search engine, the annotated search query for processing; and receiving, by the mobile device and from the search engine, a result of processing the annotated search query.

Implementations may include one or more of the following features. For example, the operations may further include identifying, by the mobile device and based on the search query, (i) a reference to a particular entity, and (ii) a reference to a category includes annotating the search query. Annotating, by the mobile device, the search query based at least on one or more facts of the subset of facts that are stored in the model for the particular entity may be done by an on-device query rewrite engine of the mobile device. Selecting, by the mobile device, a subset of facts from among the facts that are stored in the model for the particular entity, based at least on the category may be done through machine learning. The reference to the particular entity may be implicit. Selecting, by the mobile device, a subset of facts from among the facts that are stored in the model for the particular entity, based at least on the category, may be done based at least on a rule set. The operations may further include: identifying, by the mobile device and from the search query, one or more query terms and the referenced category; processing, by the mobile device, the one or more query terms and the referenced category to determine a fact type relevant to the search query; and selecting, by the mobile device, a subset of facts from among the facts that are stored in the model for the particular entity, based at least on the category and the fact type. The operations may further comprising removing, by the mobile device, private information associated with the one or more facts of the subset of facts prior to the transmission of the annotated search query to the search engine.

In another general aspect, a system includes: at least one processor; and at least one computer-readable storage medium coupled to the at least one processor having stored thereon instructions which, when executed by the at least one processor, causes the at least one processor to perform operations including: receiving, at a mobile device, a search query; identifying, by the mobile device and based on the search query, (i) a reference to a particular entity, and (ii) a reference to a category; accessing, by the mobile device, a model that (i) is stored on the mobile device, and, (ii) for each of one or more entities, stores one or more facts that are associated with the entity; selecting, by the mobile device, a subset of facts from among the facts that are stored in the model for the particular entity, based at least on the category; annotating, by the mobile device, the search query based at least on one or more facts of the subset of facts that are stored in the model for the particular entity; transmitting, from the mobile device to a search engine, the annotated search query for processing; and receiving, by the mobile device and from the search engine, a result of processing the annotated search query.

Implementations may include one or more of the following features. For example, the operations may further include identifying, by the mobile device and based on the search query, (i) a reference to a particular entity, and (ii) a reference to a category includes annotating the search query. Annotating, by the mobile device, the search query based at least on one or more facts of the subset of facts that are stored in the model for the particular entity may be done by an on-device query rewrite engine of the mobile device. The operations may further include identifying, by the mobile device and from the search query, one or more query terms and the referenced category; processing, by the mobile device, the one or more query terms and the referenced category to determine a fact type relevant to the search query; and selecting, by the mobile device, a subset of facts from among the facts that are stored in the model for the particular entity, based at least on the category and the fact type.

Other implementations of this and other aspects include corresponding systems, apparatus, and computer programs, configured to perform the actions of the methods, encoded on computer storage devices. A system of one or more computers or apparatus can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations are set forth in the accompanying drawings and the description, below. Other potential features and advantages of the disclosure will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
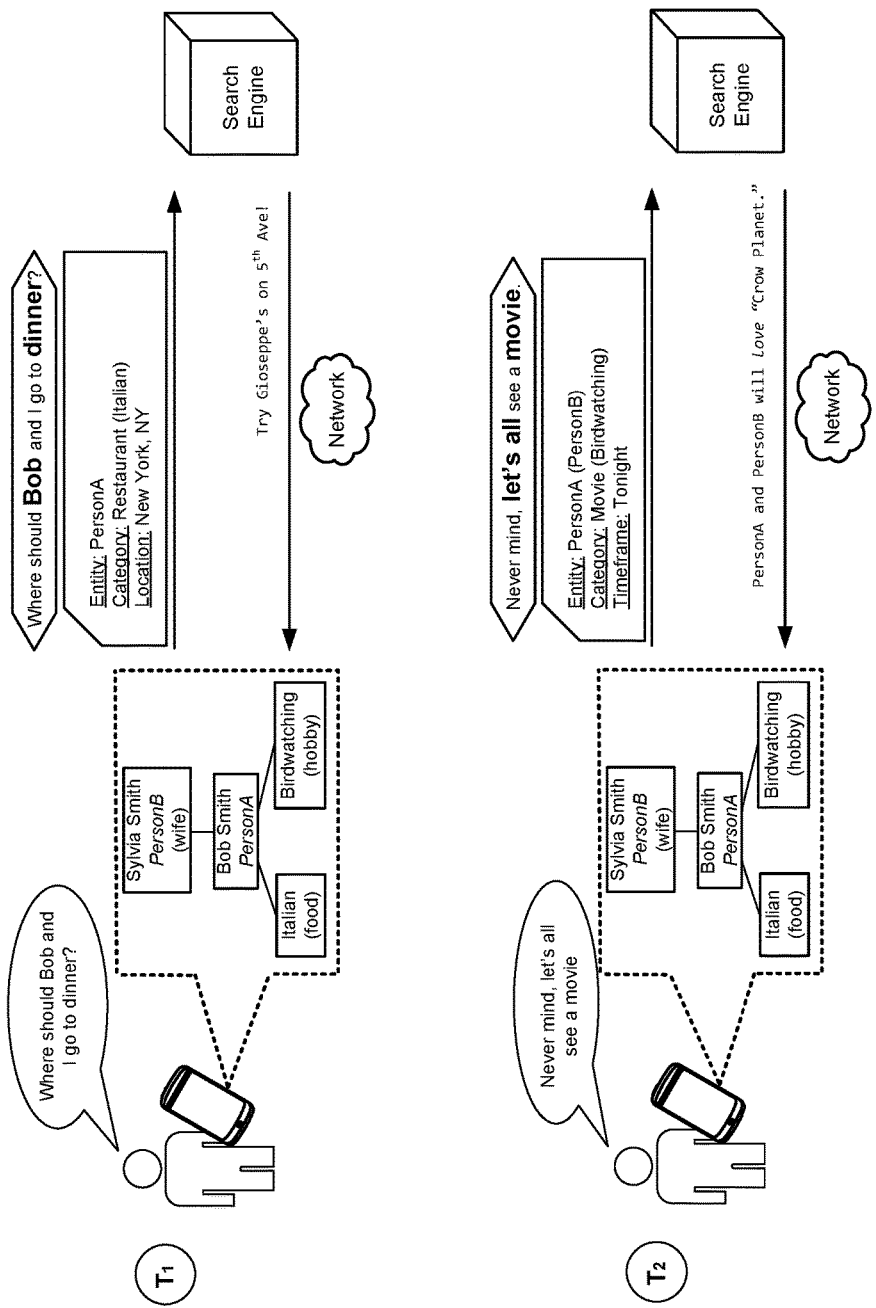
FIG. 1 illustrates example processes for annotating a query using an on-device query rewrite engine.

FIG. 1 is a diagram that illustrates example processes for annotating a query using an on-device query rewrite engine. Briefly, according to the illustrated example, an on-device query rewrite engine processes each typed or spoken query and attaches annotations prior to sending the query to the server-side search engine. The annotations may be selected to reveal only pieces of information that the user has implicitly asked to be revealed. For example, given the query "where to have dinner with David," the user is implicitly asking to reveal information about David's restaurant preferences. However, the mobile device will not reveal irrelevant information, such as his favorite football team.

In further detail, the on-device query rewrite engine depends on a private knowledge base which is constructed and maintained on-device. The private knowledge base is built based on processing of various local data, including: previously typed text, received notifications, on-screen content, sensor data, etc. The local data is processed on the device to extract entities (e.g., names of restaurants). In some implementations, the on-device query rewrite engine extracts higher level information such as relationships between entities. For example, the on-device query rewrite engine may determine that a restaurant Bob's Diner hosts meetings for a local Audubon Society chapter Jon is active in. In addition, facts relating to and relationships between entities may be explicitly curated by the user.

For a given query, the on-device query rewrite engine selects appropriate parts of the private knowledge base. The on-device query rewrite engine may analyze or classify a query into a category (e.g., restaurants, movies, family-friendly activities, etc.). The properties from the query may be used to perform a search over the private knowledge base (e.g., all pieces of information relating to restaurants and the person entity "David"). Results from the search over the private knowledge base may be facts relating to the entities and categories of the query. The retrieved facts from the knowledge base may be attached to the query before the query is sent to the server for processing.

The query attachments, or annotations, may be structured or unstructured. Structured annotations include predefined categories. For example, "dinner" can be annotated with "Italian" and "restaurants" if that is the implicit category based on facts retrieved from the private knowledge base.

Unstructured annotations include raw pieces of information the mobile device determines to be relevant to answering the query effectively. For example, the annotations may be the set of all text entries from screens which refer to both "David" and any entity of type "restaurant". The raw text may be processed by the mobile device to remove private information unrelated to the query.

Annotations are added to the query by the on-device rewrite engine and the query is sent to the server with a search request. The server then provides search results, performs an action, or answers questions with a better understanding of the user, her query, and the context in which the query is to be processed. This context is often key in order to create a server-side assistant that understands a user and what she means when she asks "where to have dinner with David". For example, given the search query "where to have dinner with David," the mobile device can inform the server who David is, what types of restaurants he likes, and which restaurants he has already been to.

In some implementations, not all rich context is transmitted to the server. The mobile device can process each search query and remove personal information relating to the identified entities and categories irrelevant to the query. The mobile device can determine what data to withhold from the server based on user input. In some implementations, the mobile device may determine what data to withhold from the server or remove from the annotation using machine learning.

Referring to FIG. 1, at a time T1, a user, Jon, takes out his mobile device and asks: "Where should Bob and I go to dinner?" Jon may type his question, or the mobile device may present a dialog box upon detecting that Jon and Bob are having a conversation about going to dinner tonight. The question is received by the mobile device as a query.

Jon's mobile device contains Jon's personal information, as well as personal information relating to Jon's friends, family, colleagues, and acquaintances. For example, Jon can store the fact that Bob's favorite Formula 1 team is McLaren-Honda or that Lisa is really doesn't like French food. In some implementations, the mobile device can automatically store facts and information about people, places, and things Jon interacts with. For example, Jon can send his grandmother an email reminding her of her appointment at Marshmallow Man's Auto Body Shop to replace the brakes on her 1957 BMW Isetta. The mobile device can store the fact that Jon's grandmother owns a 1957 BMW Isetta, as well as the fact that the Isetta needs its brakes replaced. The mobile device can store the fact that Marshmallow Man's Auto Body Shop replaces brakes on Isettas, and that Jon's grandmother uses Marshmallow Man's Auto Body Shop exclusively.

This personal information may be stored locally on the mobile device. The mobile device may store the information in a model that contains information relating to many different people, places, things, etc. The model may be a private knowledge graph. The model and the information it contains remains on Jon's mobile device.

A knowledge graph is a collection of data representing entities and relationships between entities. The data is logically described as a graph, in which each distinct entity is represented by a respective node and each relationship between a pair of entities is represented by an edge between the nodes. Each edge is associated with a relationship and the existence of the edge represents that the associated relationship exists between the nodes connected by the edge. For example, if a node A represents a person alpha, a node B represents a person beta, and an edge E is associated with the relationship "is the father of," then having the edge E connect the nodes in the direction from node A to node B in the graph represents the fact that alpha is the father of beta.

A knowledge graph can be represented by any of a variety of convenient physical data structures. For example, a knowledge graph can be represented by triples that each represent two entities in order and a relationship from the first to the second entity; for example, [alpha, beta, is the father of], or [alpha, is the father of, beta], are alternative ways of representing the same fact. Each entity and each relationship can be and generally will be included in multiple triples.

Alternatively, each entity can be stored as a node once, as a record or an object, for example, and linked through a linked list data structure to all the relationships the entity has and all the other entities to which the entity is related. More specifically, a knowledge graph can be stored as an adjacency list in which the adjacency information includes relationship information.

It is generally advantageous to represent each distinct entity and each distinct relationship with a unique identifier.

The entities represented by a knowledge graph need not be tangible things or specific people. The entities can include particular people, places, things, artistic works, concepts, events, or other types of entities. Thus, a knowledge graph can include data defining relationships between people, e.g., co-stars in a movie; data defining relationships between people and things, e.g., a particular singer recorded a particular song; data defining relationships between places and things, e.g., a particular type of wine comes from a particular geographic location; data defining relationships between people and places, e.g., a particular person was born in a particular city; and other kinds of relationships between entities.

In some implementations, each node has a type based on the kind of entity the node represents; and the types can each have a schema specifying the kinds of data that can be maintained about entities represented by nodes of the type and how the data should be stored. So, for example, a node of a type for representing a person could have a schema defining fields for information such as birth date, birth place, and so on. Such information can be represented by fields in a type-specific data structure, or by triples that look like node-relationship-node triples, e.g., [person identifier, was born on, date], or in any other convenient predefined way. Alternatively, some or all of the information specified by a type schema can be represented by links to nodes in the knowledge graph; for example, [one person identifier, child of, another person identifier], where the other person identifier is a node in the graph.

For situations in which the systems discussed here collect personal information about users, or may make use of personal information, the users may be provided with an opportunity to control whether programs or features collect personal information (e.g., information about a user's social network, social actions or activities, profession, a user's preferences, or a user's current location), or to control whether and/or how to receive content from the content server that may be more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, ZIP code, or state level), so that a particular location of a user cannot be determined. Thus, the user may have control over how information is collected about him or her and used by a content server.

Jon's mobile device can parse Jon's spoken query for important words that will assist a search engine with providing better results for Jon's query. In this example, the mobile device determines that Jon is asking about Bob. More particularly, Jon is asking about Bob Smith. Jon's mobile device could have determined this from emails exchanged between Jon and Bob about having dinner tonight. In some implementations, the mobile device could have determined this from a calendar event, a text message, etc.

The mobile device can access the model stored locally to find personal information related to Bob Smith. As shown in FIG. 1, several facts related to Bob are shown. In this example, Bob has a wife, Sylvia; he likes to go birdwatching as a hobby; and he enjoys Italian food.

The mobile device can anonymize entity identifiers. For example, the mobile device can anonymize Bob and Sylvia when sending information regarding either person through a network, to a search engine, etc. by associating each with a person identifier. In this example, Bob is associated with PersonA and Sylvia is associated with PersonB.

The mobile device can then determine which facts are relevant to Jon's query. Jon asked about "Bob" and "dinner." The mobile device can determine that Jon is asking about food, and that Bob likes Italian food. The model contains other facts, but the mobile device determines that Jon is only asking about dinner with Bob, and not Sylvia. The mobile device can then determine that the fact that Bob has a wife, Sylvia, is not relevant. The mobile device determines that Bob's hobby, birdwatching, does not relate to food, and so the fact that Bob is an avid birdwatcher is not relevant, either.

The mobile device may then attach the relevant facts to, or annotate, Jon's query. The mobile device may identify components of the query to attach the relevant facts to. For example, Jon's mobile device can identify an entity, a query category, and a location. In this example, the entity is Bob Smith; the query category is "Restaurant" and the location is New York, N.Y. The mobile device may offer privacy control by sending information about Bob to a search engine or across a network as data associated with a person identifier of PersonA.

The mobile device may determine that Jon is in New York, N.Y. from GPS data stored locally. In some examples, Jon may not be in New York—Bob may be the one in New York, and Jon could be visiting Bob that weekend. The mobile device may determine this situation from emails, text messages, etc. between Jon and Bob. In some implementations, the mobile device may determine that Jon is visiting Bob from a calendar event, reminder, etc. stored locally. The relevant fact (that Bob loves Italian food) may be attached to the appropriate component of the query: the category "Restaurant."

Relevant facts may be attached to the query as additional fields. For example, the mobile device may add an "Annotation" component with the value "Italian" to the query. In some examples, the mobile device may simply add "Italian" to the query. In addition, the mobile device can organize components of the query or flag particularly relevant components. The mobile device may add multiple annotations to the query. For example, the mobile device may add annotations with the values "Italian," "pizza," and "Chianti" to the query to indicate that Bob loves Italian cuisine, including pizza and Chianti.

The mobile device can withhold certain facts from the annotations. For example, because Sylvia and birdwatching are not relevant to Jon and Bob's dinner plans, the mobile device may not include the annotations with Jon's query.

The annotated query is sent to a search engine over a network. For example, the mobile device can send the query to the search engine over the Internet. The search engine may then process the annotated query to provide Jon with a result.

The search engine may receive the query "Where should Bob and I go to dinner?" and the annotations that Bob refers to PersonA, that the query is related to "Restaurant" and, more specifically, "Italian Restaurant," and that Jon and PersonA are currently in New York, N.Y. The search engine may then process the query, with the annotations, to provide Jon with a more personalized, specific, and relevant result.

The search engine may provide a result for the annotated search query to Jon's mobile device. The result may be transmitted over the network to the mobile device for display. Jon's mobile device may present the result "Try Gioseppe's on $5^{th}$ Ave!" on a display. In some implementations, Jon's mobile device may read the result to him, make a reservation under his name, send a calendar invitation to PersonA, etc. The mobile device may receive a result referencing PersonA and map the person identifier to the entity associated with the person identifier; in this example, Bob Smith is associated with the person identifier PersonA. In some examples, the mobile device provides results to the user with PersonA replaced by Bob Smith.

At a time T2, Jon may change his mind and decide "Never mind, let's all see a movie." Jon can say the query to his mobile device, enter it into a search field, etc. In some examples, Jon could receive a text message or phone call from Bob requesting a change of plans: Bob may decide to bring Sylvia along.

The mobile device can receive the new query and, once again, access the model for relevant facts. In this example, Jon does not explicitly state who "let's all" refers to. The mobile device may identify a person without receiving explicit information. For example, the mobile device may determine that Jon is asking about Bob and another person since Jon just asked about Bob. The mobile device can then access the model stored locally to find personal information related to Bob Smith, and find Sylvia Smith.

Jon mentioned "Let's all" and "movie." The mobile device can determine that Jon is asking about an activity, and more specifically, a movie, and that both Bob and Sylvia are joining. The mobile device determines that Bob's love for Italian food is not relevant to activities or movies. The mobile device may determine that Bob's hobby, birdwatching, is related to activities, and so the fact that Bob loves birdwatching is relevant.

The mobile device may then annotate Jon's query. For example, Jon's mobile device can identify an entity, a query category, and a timeframe. In this example, the entity is Bob Smith; the query category is "Movie" and the timeframe is tonight.

The mobile device may determine that Jon is talking about seeing a movie tonight using data stored locally. The mobile device may determine this timeframe from emails, text messages, etc. between Jon and Bob. In some implementations, the mobile device may determine that Jon and Bob are talking about going to a movie tonight from a calendar event, reminder, etc. stored locally.

The mobile device may attach Sylvia as an annotation to Jon's query. In this example, the mobile device may identify Bob as PersonA and Sylvia as PersonB, attaching PersonB as an annotation to the entity PersonA. The fact that Bob loves birdwatching may be attached to the appropriate component of the query: the category "Movie."

The annotated query is sent to the search engine over the network, and the search engine may process the query "Never mind, let's all see a movie." with the annotations to provide Jon with a more personalized, specific, and relevant result.

The search engine may provide a result for the annotated search query to Jon's mobile device. The result may be transmitted over the network to the mobile device for display. In this example, the search engine receives information about entity PersonA and annotation PersonB. The search engine may send results to Jon's mobile device as "PersonA and PersonB will love "Crow Planet!"". Jon's mobile device may then map the person identifiers PersonA and PersonB to Bob and Sylvia Smith, respectively, and display "Bob and Sylvia will love "Crow Planet." In some implementations, Jon's mobile device may read the result to him, buy tickets to the movie, send a calendar invitation to Bob and to Sylvia, etc.

Figure 2:
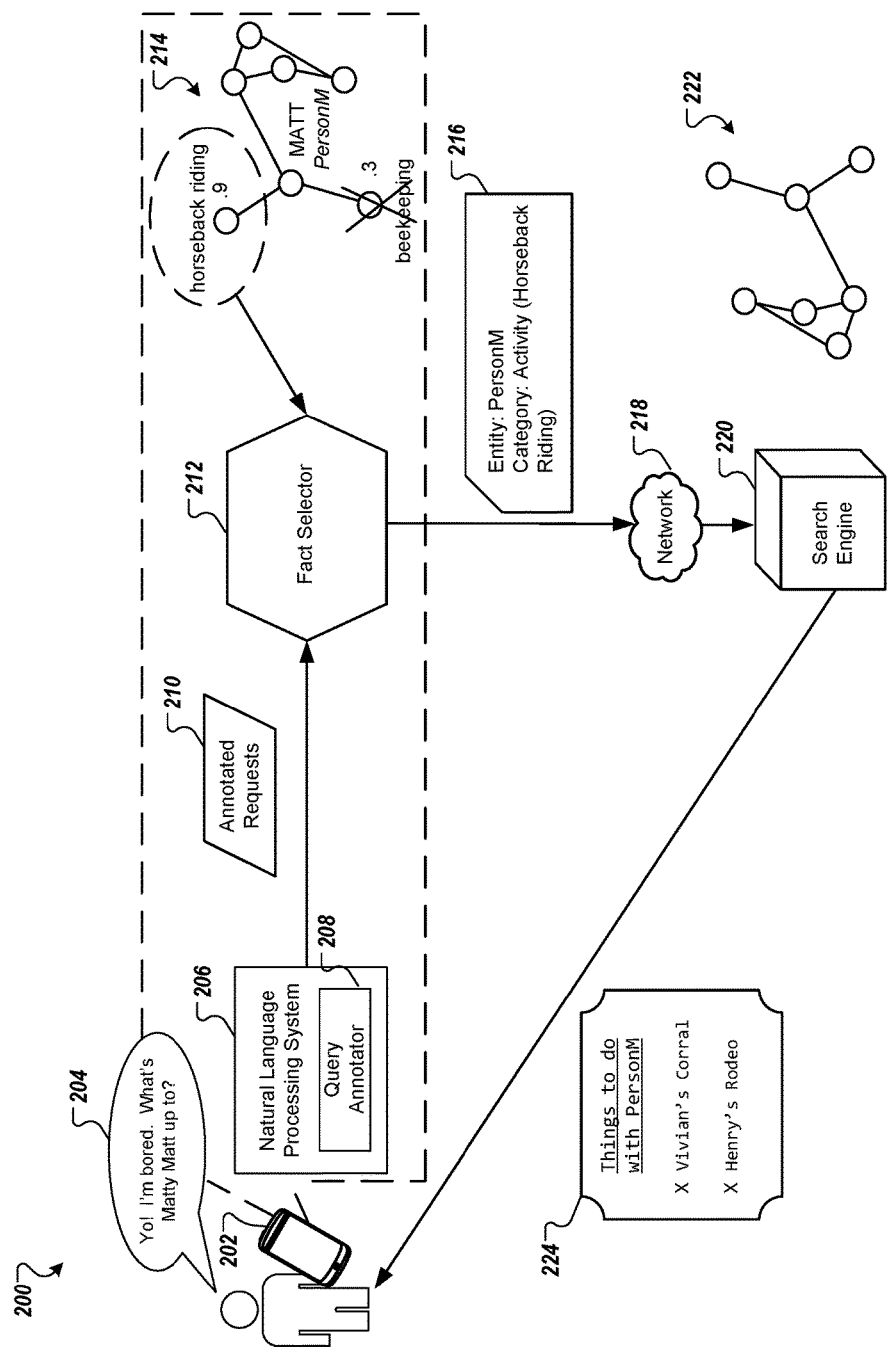
FIG. 2 illustrates an example system for annotating queries with selected facts stored on a user's mobile device.

FIG. 2 shows an example of a system 200 for annotating queries with selected facts stored on a user's mobile device. The system 200 represents a system that may be used to perform the process described with respect to FIG. 1. Briefly, according to an example, an on-device query rewrite engine processes each typed or spoken query and attaches annotations prior to sending the query to the server-side search engine. The annotations may be selected to reveal only pieces of information that the user has implicitly asked to be revealed. For example, given the query "where to have dinner with David," the user is implicitly asking to reveal information about David's restaurant preferences. The mobile device 202 can be various mobile devices, such as personal digital assistants, cellular telephones, smartphones, and other similar computing devices. The components shown here, their connections and relationships, and their functions, are meant to be exemplary only, and are not meant to limit the implementations described and/or claimed in this document.

The system 200 includes a mobile device 202 in communication with a network 216 in communication with a search engine 218. The mobile device 202 is in communication with the network 216 through various forms of connections, such as WiFi, Ethernet, and other appropriate connection media. The search engine 218 is communicably coupled to the network 216, and can communicate with the network 216 through communications protocols or protocol families such as TCP/IP, IPX/SPX, X.25, and other appropriate communications protocols or protocol families. The network 216 can communicate with the mobile device 202 using previously mentioned communications protocols or protocol families.

A user of the mobile device 202 submits a search query 204. The search query 204 includes references to at least one entity and at least one category. Entities are proper nouns, including people, places, organizations, brands, etc. Categories include classifications of what queries are directed to, including restaurants, movies, activities, etc. The search query 204 is communicated to the mobile device 202 in various forms, such as a spoken query, a typed query, an implied query, and other appropriate query forms. For example, the user can send an email to his project group suggesting that they go to lunch on campus at 12 p.m. In other examples, the user can type a question into a search engine regarding what shop he should go to get his engine rebuilt. In this example, the user speaks to the mobile device 202, saying: "Yo! I'm bored. What's Matty Matt up to?".

The search query 204 can be an indirect question that does not explicitly reference an entity, a category, or both. For example, a user can ask the mobile device 202: "What should we do?". The user may have just received a text message from a friend, Sarah, about going to dinner the next night. In other examples, the search query 204 is a direct question that explicitly references at least an entity or a category. For example, a user can type: "Where is the best place for Matt and me to go birdwatching together?".

The mobile device 202 includes a natural language processing system 206, which uses language modeling to parse query inputs. The natural language processing system 206 uses language models such as n-gram models, unigram models, and other appropriate language models.

The natural language processing system 206 includes a query annotator 208. The query annotator 208 annotates the parsed queries in various ways, attaching notes or keywords to expand the query, narrow the query, redirect the query, rewrite the query, etc. For example, the natural language processing system 206 can receive an input of "What should Kelsey and I have for dinner?", determine that the query is related to food, and attach the keyword "food" to the query, creating an annotated request 210.

The fact selector 212 is an on-device query rewrite engine that selects and attaches facts to queries. In this example, the fact selector 212 attaches facts to queries that have already been rewritten. In other examples, the fact selector 212 can attach facts to queries received directly from a user.

The local knowledge graph 214 is stored locally on the mobile device 202, and contains user-specific data. Nodes of the local knowledge graph 214 may be determined from what a user has previously said, typed, what he has seen on-screen, what is in his current environment, sensor data, and any other appropriate sources of information. The local knowledge graph 214 creates context for a user's queries and assisting a search engine with providing the user with relevant, personalized answers.

The local knowledge graph 214 contains one or more facts associated with one or more entities. For example, the local knowledge graph 214 contains three facts associated with George, fifteen facts associated with Burger Emporium, and one fact associated with Spot, George's dog. The facts are associated with one or more categories, such as food, hobbies, family, and other appropriate categories. For example, a fact associated with George is that he likes to go fishing with Spot. In this example, the fact is associated with the entities George and Spot, and is associated with the hobby category.

In the illustrated example, the local knowledge graph 214 includes a portion associated with Matt. The local knowledge graph 214 may associate a person identifier with Matt to provide anonymity when transmitting information across a network or to a search engine. In this example, the person identifier is PersonM. The portion of the local knowledge graph 214 associated with Matt includes two facts. The facts can express various preferences of Matt, such as positive interest, active dislike of, interest only when with another entity, or other appropriate preferences.

In some examples, the facts are associated with an interest level. In this example, Matt's interest in the activity horseback riding is 0.9. Matt's interest in the activity beekeeping is 0.3. In some examples, an interest value is measured out of 1, and a value less than 0.5 indicates dislike or disinterest in a category, entity, etc. In other examples, an interest value is measured with both positive and negative numbers, and an interest value such as −0.7 indicates an intense dislike or disinterest in a category, entity, etc., or out of any numbers, such as 3 out of 5.

In some examples, the local knowledge graph 214 contains a predetermined set of facts, and each fact is assigned an interest value upon the mobile device 202 receiving, detecting, identifying, etc. information relevant to the fact. For example, the local knowledge graph 214 can include several facts associated with the food category, including: Italian, French, blueberries, ice cream, Cajun, and other appropriate types of foods. In one example, each of the facts can have null values or 0 values until the mobile device 202 detects that a user, Tom, has posted on his blog that he loves blueberries and ice cream. The local knowledge graph 214 can then store a positive value in the blueberries and ice cream facts. In some examples, the local knowledge graph 214 has set values based on the words uttered, typed, or otherwise entered by the user. For example, if Tom had said he loved blueberries, blueberries would be assigned a value of 1, whereas if Tom had said he liked blueberries, blueberries would be assigned a value of 0.7.

The local knowledge graph 214 can sort, attach values to, etc. facts in relation to other facts. For example, Chris can tell his mom that he loves horseback riding and downhill skiing, but that he prefers horseback riding. The local knowledge graph 214 can then rank horseback riding above downhill skiing, but designate both as positively viewed by Chris.

The local knowledge graph 214 may learn from a user's choices to rearrange, reorder, reevaluate, etc. facts relative to each other. For example, Max loves Mexican food, but he always chooses to go to a French restaurant with his girlfriend, Sam. The local knowledge graph 214 can link French restaurants with Sam.

The local knowledge graph 214 can expand to include more facts each time a new fact is detected by the mobile device 202. For example, the local knowledge graph 214 can add a new node to David's facts for each fact detected that is associated with David.

The fact selector 212 receives the annotated request 210 from the natural language processing system 206, and selects a relevant fact from the local knowledge graph 214. In some examples, the fact selector 212 uses the annotated request 210 to perform a search over the local knowledge graph 214.

In some examples, the fact selector 212 can only access the local knowledge graph 214 with prior consent from a user of the mobile device 202. The consent can be explicit or implicit. For example, the user can ask about "dinner with Dan" and implicitly give consent for the fact selector to access the portion of the local knowledge graph 214 associated with Dan. In other examples, a user of the mobile device 202 can select facts, categories, etc. to keep from the fact selector 212. For example, the user can designate all facts associated with clothing as inaccessible by the fact selector 212. The user can designate all facts associated with the location of his private cabin as inaccessible by the fact selector 212.

In this example, the fact selector 212 determines that the annotated request 210 is associated with the entity Matt and the activity category. The fact selector 212 accesses the local knowledge graph 214 and looks for facts associated with the activity category. The fact selector 212 determines that there two facts associated with the activity category: horseback riding, and beekeeping.

In some examples, the fact selector 212 selects facts that are positively viewed by the entity. In this example, the fact selector 212 selects horseback riding, which Matt likes, and not beekeeping, which Matt dislikes. In some examples, the fact selector 212 selects facts that are negatively view by the entity. For example, a query could ask: "What should I avoid mentioning when I meet Jane, Roger's wife?". The fact selector 212 would then select facts negatively viewed by Jane.

The fact selector 212 processes each annotated request 210 and attaches facts prior to transmitting the request to a server-side search engine (e.g., the search engine 218). The annotated request 210 with the attached facts is a rewritten request 216. The annotations may be structured or unstructured. The query is annotated with predefined categories (e.g., "dinner" is annotated with "Italian restaurants") when the annotations are structured.

When the annotations are unstructured, the query is annotated with raw pieces of information that the fact selector 212 has determined to be relevant to answering the query effectively. For example, the fact selector 212 can attach all text from screens of the mobile device 202 that refer to both Matt and horseback riding. In some examples, the fact selector 202 processes the raw data to remove private information that would not be relevant or helpful in answering the query.

The fact selector 212 transmits the rewritten request 216 to the network 218. The rewritten request 216 can be a new, rewritten query. In some examples, the rewritten request 216 is the original query 204 or the annotated request 210 with further annotations or attachments. For example, the rewritten query 216 includes the identified entity and category (PersonM and activity, respectively), referenced in the original query 204. Additionally, the fact selected by the fact selector 212 is attached to the rewritten query 216. In this example, the fact that Matt loves horseback riding is attached to the identified category. In other examples, the rewritten query 216 includes the original query 204: "Yo! I'm bored. What's Matty Matt up to?" as well as the identified entity and category. In some examples, the original query 204 may be anonymized with the person identifier. For example, the original query 204 included in rewritten query 216 may be: "Yo! I'm bored. What's PersonM up to?".

The network 218 then transmits the rewritten request 216 to the search engine 220. The search engine 220 can access a global knowledge graph 222 to process the rewritten request 216 and provide an answer to a user of the mobile device 202. The search engine 218 can be any service or engine, including $1^{st}$ party and $3^{rd}$ party services. For example, the search engine 218 can be IMDb when given a movie query, or OpenTable when looking for a place to eat.

The global knowledge graph 222 can be created, curated, updated, etc. using information obtained from the Internet, or other services or databases that are available to the global knowledge graph 222.

The search engine 220 processes the rewritten request 216 to produce an answer to the rewritten request 216. The search engine 220 uses processes such as web crawling, indexing, and other appropriate processes to search for answers to received queries.

Upon finding an answer, the search engine 220 presents a result 224 to the mobile device 202. The result 224 may include more than one result. For example, if the search engine 220 is a website search engine, the result 224 may provide one or more pages of results. In some examples, the search engine 220 is a local search engine, or a website search engine set to only produce one result 224.

In this example, the result 224 indicates the query being answered (Things to do with PersonM) and the answers produced. Two "Things to do with PersonM" are found: Vivian's Corral and Henry's Rodeo. Vivian's Corral and Henry's Rodeo may be attractions near the user of the mobile device 202 and PersonM. Both answers of the result 224 are related to horses or horseback riding, and are tailored to PersonM's interests.

The mobile device 202 may map the person identifier to the entity stored within the mobile device 202 before presenting the result 224 to the user. For example, the mobile device 202 may replace PersonM with Matt before presenting the answer to the user.

Using the result 224, the user of the mobile device 202 may interact with the results. For example, the user may buy tickets to Vivian's Corral, or get directions to Henry's Rodeo. In some examples, the user can select the result 224 to open an appropriate application. For example, the mobile device 202 can automatically open a navigation application and populate the destination with the address of Henry's Rodeo. The mobile device 202 can present the user of the mobile device 202 with a menu of appropriate applications or actions. In some examples, the applications or actions are presented based on the user's selection from the result 224. For example, if the user selects a restaurant, Yelp or OpenTable may be presented.

Figure 3:
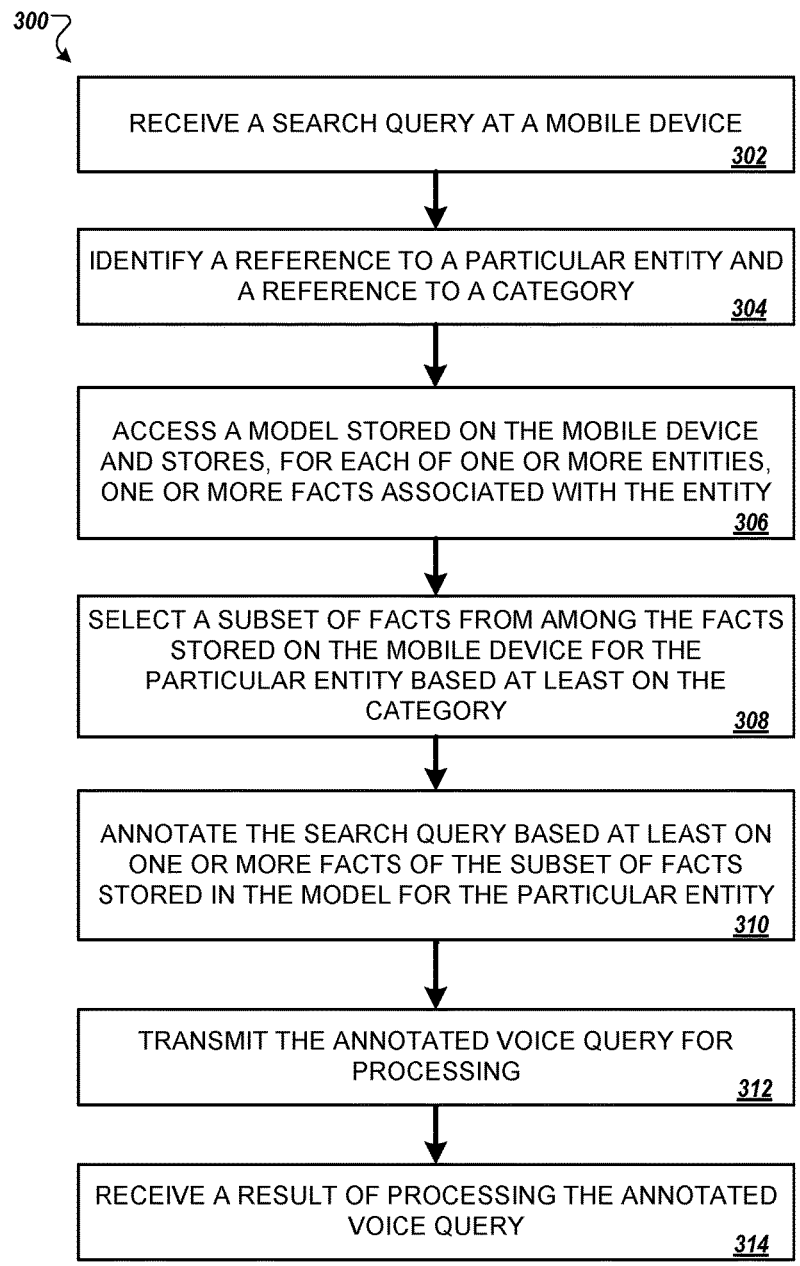
FIG. 3 is a flowchart illustrating an example process that provides a user with more relevant results.

FIG. 3 is a flowchart illustrating an example process 300 that provides a user with more relevant results. Briefly, according to an example, the process 300 includes receiving a search query at a mobile device (302). For example, the mobile device 202 may receive a search query 204 of: "Yo! I'm bored. What's Matty Matt up to?" from a user of the mobile device 202. The process 300 includes identifying a reference to a particular entity and a reference to a category (304). For example, the natural language processing system 206 or query annotator 208 may identify a reference to Matt (PersonM) and a reference to an activity. The natural language processing system 206 or query annotator 208 may annotate the original query 204, creating the annotated request 210.

The process 300 continues by accessing a model stored on the mobile device and stores, for each of one or more entities, one or more facts associated with the entity (306). For example, the fact selector 212 may access the local knowledge graph 214 on the mobile device 202. The process 300 includes selecting a subset of facts from among the facts stored on the mobile device for the particular entity based at least on the category (308). For example, the fact selector 212 may select a subset of facts from the local knowledge graph 214 relating to PersonM and based on the activity category.

The process 300 includes annotating the search query based at least on one or more facts of the subset of facts stored in the model for the particular entity (310). For example, the fact selector 212 may select horseback riding and produce the rewritten query 216 that includes the entity (PersonM) and the annotated category (horseback riding as an activity). The process 300 includes transmitting the annotated search query for processing (312). For example, the fact selector 212 may transmit the rewritten query 216 to the network 218, which transmits the rewritten query 216 to the search engine 220.

The process 300 concludes by receiving a result of processing the annotated search query (414). For example, the search engine 220 may access a global knowledge graph 222 to produce a result of processing the rewritten query 216, and transmit the result 224 to the mobile device 202.

Figure 4:
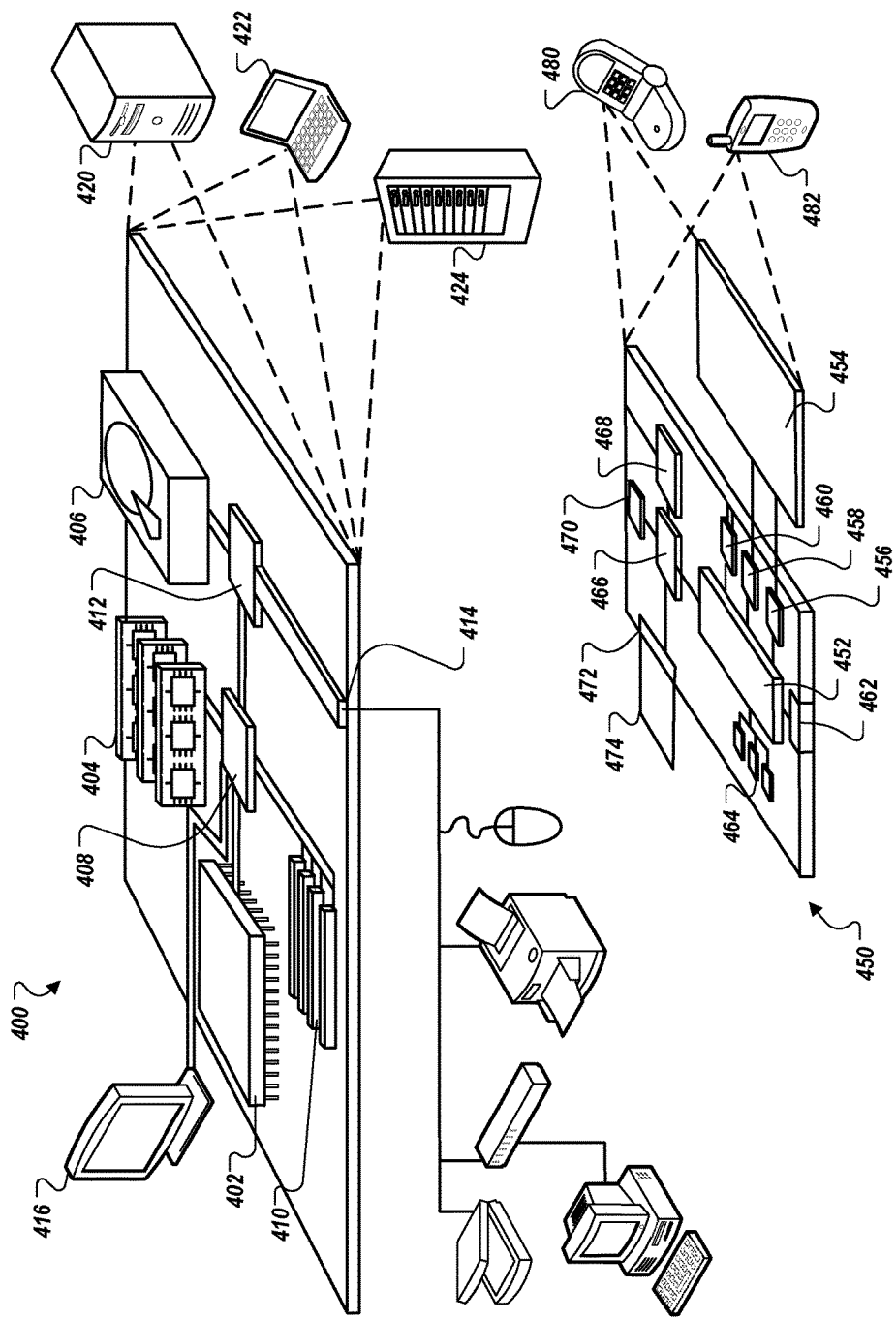
FIG. 4 is a schematic diagram that shows an example of a computing device and a mobile computing.

FIG. 4 shows an example of a computing device 400 and an example of a mobile computing device 450 that can be used to implement the techniques described above. The computing device 400 is intended to represent various forms of digital computers, such as laptops, desktops, workstations, personal digital assistants, servers, blade servers, mainframes, and other appropriate computers. The mobile computing device 450 is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 400 includes a processor 402, a memory 404, a storage device 406, a high-speed interface 408 connecting to the memory 404 and multiple high-speed expansion ports 410, and a low-speed interface 412 connecting to a low-speed expansion port 414 and the storage device 406. Each of the processor 402, the memory 404, the storage device 406, the high-speed interface 408, the high-speed expansion ports 410, and the low-speed interface 412, are interconnected using various busses, and may be mounted on a common motherboard or in other manners as appropriate.

The processor 402 can process instructions for execution within the computing device 400, including instructions stored in the memory 404 or on the storage device 406 to display graphical information for a GUI on an external input/output device, such as a display 416 coupled to the high-speed interface 408. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 404 stores information within the computing device 400. In some implementations, the memory 404 is a volatile memory unit or units. In some implementations, the memory 404 is a non-volatile memory unit or units. The memory 404 may also be another form of computer-readable medium, such as a magnetic or optical disk.

The storage device 406 is capable of providing mass storage for the computing device 400. In some implementations, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The computer program product can also be tangibly embodied in a computer- or machine-readable medium, such as the memory 404, the storage device 406, or memory on the processor 402.

The high-speed interface 408 manages bandwidth-intensive operations for the computing device 400, while the low-speed interface 412 manages lower bandwidth-intensive operations. Such allocation of functions is exemplary only. In some implementations, the high-speed interface 408 is coupled to the memory 404, the display 416 (e.g., through a graphics processor or accelerator), and to the high-speed expansion ports 410, which may accept various expansion cards (not shown). In the implementation, the low-speed interface 412 is coupled to the storage device 406 and the low-speed expansion port 414. The low-speed expansion port 414, which may include various communication ports (e.g., USB, Bluetooth, Ethernet, wireless Ethernet) may be coupled to one or more input/output devices, such as a keyboard, a pointing device, a scanner, or an networking device such as a switch or router, e.g., through an network adapter.

The computing device 400 may be implemented in a number of different forms, as shown in the figure. For example, it may be implemented as a standard server 420, or multiple times in a group of such servers. In addition, it may be implemented in a personal computer such as a laptop computer 422. It may also be implemented as part of a rack server system 424. Alternatively, components from the computing device 400 may be combined with other components in a mobile device (not shown), such as a mobile computing device 450. Each of such devices may contain one or more of the computing device 400 and the mobile computing device 450, and an entire system may be made up of multiple computing devices communicating with each other.

The mobile computing device 450 includes a processor 452, a memory 464, an input/output device such as a display 454, a communication interface 466, and a transceiver 468, among other components. The mobile computing device 450 may also be provided with a storage device, such as a micro-drive or other device, to provide additional storage. Each of the processor 452, the memory 464, the display 454, the communication interface 466, and the transceiver 468, are interconnected using various buses, and several of the components may be mounted on a common motherboard or in other manners as appropriate.

The processor 452 can execute instructions within the mobile computing device 450, including instructions stored in the memory 464. The processor 452 may be implemented as a chipset of chips that include separate and multiple analog and digital processors. The processor 452 may provide, for example, for coordination of the other components of the mobile computing device 450, such as control of user interfaces, applications run by the mobile computing device 450, and wireless communication by the mobile computing device 450.

The processor 452 may communicate with a user through a control interface 458 and a display interface 456 coupled to the display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may provide communication with the processor 452, so as to enable near area communication of the mobile computing device 450 with other devices. The external interface 462 may provide, for example, for wired communication in some implementations, or for wireless communication in other implementations, and multiple interfaces may also be used.

The memory 464 stores information within the mobile computing device 450. The memory 464 can be implemented as one or more of a computer-readable medium or media, a volatile memory unit or units, or a non-volatile memory unit or units. An expansion memory 474 may also be provided and connected to the mobile computing device 450 through an expansion interface 472, which may include, for example, a SIMM (Single In Line Memory Module) card interface. The expansion memory 474 may provide extra storage space for the mobile computing device 450, or may also store applications or other information for the mobile computing device 450. Specifically, the expansion memory 474 may include instructions to carry out or supplement the processes described above, and may include secure information also. Thus, for example, the expansion memory 474 may be provide as a security module for the mobile computing device 450, and may be programmed with instructions that permit secure use of the mobile computing device 450. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 464, the expansion memory 474, or memory on the processor 452. In some implementations, the computer program product can be received in a propagated signal, for example, over the transceiver 468 or the external interface 462.

The mobile computing device 450 may communicate wirelessly through the communication interface 466, which may include digital signal processing circuitry where necessary. The communication interface 466 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 468 using a radio-frequency. In addition, short-range communication may occur, such as using a Bluetooth, Wi-Fi, or other such transceiver (not shown). In addition, a GPS (Global Positioning System) receiver module 570 may provide additional navigation- and location-related wireless data to the mobile computing device 450, which may be used as appropriate by applications running on the mobile computing device 450.

The mobile computing device 450 may also communicate audibly using an audio codec 460, which may receive spoken information from a user and convert it to usable digital information. The audio codec 460 may likewise generate audible sound for a user, such as through a speaker, e.g., in a handset of the mobile computing device 450. Such sound may include sound from voice telephone calls, may include recorded sound (e.g., voice messages, music files, etc.) and may also include sound generated by applications operating on the mobile computing device 450.

The mobile computing device 450 may be implemented in a number of different forms, as shown in the figure. For example, it may be implemented as a cellular telephone 480. It may also be implemented as part of a smart-phone 482, personal digital assistant, tablet computer, wearable computer, or other similar mobile device.

A number of implementations have been described. Nevertheless, it will be understood that various modifications may be made without departing from the spirit and scope of the disclosure. For example, various forms of the flows shown above may be used, with steps re-ordered, added, or removed.

All of the functional operations described in this specification may be implemented in digital electronic circuitry, or in computer software, firmware, or hardware, including the structures disclosed in this specification and their structural equivalents, or in combinations of one or more of them. The techniques disclosed may be implemented as one or more computer program products, i.e., one or more modules of computer program instructions encoded on a computer-readable medium for execution by, or to control the operation of, data processing apparatus. The computer readable-medium may be a machine-readable storage device, a machine-readable storage substrate, a memory device, a composition of matter affecting a machine-readable propagated signal, or a combination of one or more of them. The computer-readable medium may be a non-transitory computer-readable medium. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, the techniques disclosed may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may include a computing system that includes a back end component, e.g., as a data server, or that includes a middleware component, e.g., an application server, or that includes a front end component, e.g., a client computer having a graphical user interface or a Web browser through which a user may interact with an implementation of the techniques disclosed, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method comprising:
accessing a local storage of a client-side assistant device, the local storage storing data identifying entities that are other than one or more users of the client-side assistant device and data identifying relationships between the entities that are other than the one or more users of the client-side assistant device, and the data stored in the database being derived from local, spoken interactions between the one or more users and the client-side assistant device;
receiving a query at the client-side assistant device from a particular user of the client-side assistant device;
determining that the query likely includes an implicit request to include, with the query, select data about a particular entity that is other than the one or more users of the client-side assistant device and that is stored in the local storage of the client-side assistant device, when transmitting the query from the client-side assistant device to a server-side assistant device, for execution;
in response to determining that the query likely includes an implicit request to include, with the query, the select data about the particular entity that is other than the one or more users of the client-side assistant device and that is stored in the local storage of the client-side assistant device, transmitting, to the server-side assistant device and for execution, a representation of (i) the query, and (ii) the select data about the particular entity that is other than the one or more users of the client-side assistant device and that is stored in the local storage of the client-side assistant device; and
receiving, from the server-side assistant device a response to the query that the server-side assistant device has tailored according to the select data.

2. The method of claim 1, wherein the representation of (i) the query, and (ii) the select data that is stored in the local storage of the client-side assistant device comprises an annotated representation of the query.

3. The method of claim 2 comprising:
generating, by an on-device query rewrite engine of the client-side assistant device, the annotated representation of the query by generating an annotation that references the select data that is stored in the local storage of the client-side assistant device.

4. The method of claim 1 comprising:
identifying, based on the query, a reference to the particular entity that is other than the one or more users of the client-side assistant device; and
selecting a proper subset of facts from among stored data in the local storage of the client-side assistant device.

5. The method of claim 1, wherein the local storage of the client-side assistant device includes a model that, for each of the entities that are other than the one or more users of the client-side assistant device, stores one or more facts that associated with the entity, and
wherein the select data comprises one or more facts that are associated with a particular entity associated with the query.

6. The method of claim 5, wherein the reference to the particular entity associated with the query is implicit.

7. The method of claim 1, comprising removing, by the mobile computing device, private information associated with the select data that is stored in the local storage of the client-side assistant device prior to the transmission to the server-side assistant device.

8. At least one non-transitory computer-readable storage medium encoded with executable instructions that, when executed by at least one processor, cause the at least one processor to perform operations comprising:
accessing a local storage of a client-side assistant device, the local storage storing data identifying entities that are other than one or more users of the client-side assistant device and data identifying relationships between the entities that are other than the one or more users of the client-side assistant device, and the data stored in the database being derived from local, spoken interactions between the one or more users and the client-side assistant device;
receiving a query at the client-side assistant device from a particular user of the client-side assistant device;
determining that the query likely includes an implicit request to include, with the query, select data about a particular entity that is other than the one or more users of the client-side assistant device and that is stored in the local storage of the client-side assistant device, when transmitting the query from the client-side assistant device to a server-side assistant device, for execution;
in response to determining that the query likely includes an implicit request to include, with the query, the select data about the particular entity that is other than the one or more users of the client-side assistant device and that is stored in the local storage of the client-side assistant device, transmitting, to the server-side assistant device and for execution, a representation of (i) the query, and (ii) the select data about the particular entity that is other than the one or more users of the client-side assistant device and that is stored in the local storage of the client-side assistant device; and
receiving, from the server-side assistant device a response to the query that the server-side assistant device has tailored according to the select data.

9. The non-transitory computer-readable storage medium of claim 8, wherein the representation of (i) the query, and (ii) the select data that is stored in the local storage of the client-side assistant device comprises an annotated representation of the query.

10. The non-transitory computer-readable storage medium of claim 9, the operations comprising:
generating, by an on-device query rewrite engine of the client-side assistant device, the annotated representation of the query by generating an annotation that references the select data that is stored in the local storage of the client-side assistant device.

11. The non-transitory computer-readable storage medium of claim 8, the operations comprising:
identifying, based on the query, a reference to the particular entity that is other than the one or more users of the client-side assistant device; and
selecting a proper subset of facts from among stored data in the local storage of the client-side assistant device.

12. The non-transitory computer-readable storage medium of claim 8, wherein the local storage of the client-side assistant device includes a model that, for each of the entities that are other than the one or more users of the client-side assistant device, stores one or more facts that associated with the entity, and
wherein the select data comprises one or more facts that are associated with a particular entity associated with the query.

13. The non-transitory computer-readable storage medium of claim 12, wherein the reference to the particular entity associated with the query is implicit.

14. The non-transitory computer-readable storage medium of claim 8, the operations comprising removing, by the mobile computing device, private information associated with the select data that is stored in the local storage of the client-side assistant device prior to the transmission to the server-side assistant device.

15. A system comprising:
- at least one processor; and
- at least one computer-readable storage medium coupled to the at least one processor having stored thereon instructions which, when executed by the at least one processor, causes the at least one processor to perform operations comprising:
  - accessing a local storage of a client-side assistant device, the local storage storing data identifying entities that are other than one or more users of the client-side assistant device and data identifying relationships between the entities that are other than the one or more users of the client-side assistant device, and the data stored in the database being derived from local, spoken interactions between the one or more users and the client-side assistant device;
  - receiving a query at the client-side assistant device from a particular user of the client-side assistant device;
  - determining that the query likely includes an implicit request to include, with the query, select data about a particular entity that is other than the one or more users of the client-side assistant device and that is stored in the local storage of the client-side assistant device, when transmitting the query from the client-side assistant device to a server-side assistant device, for execution;
  - in response to determining that the query likely includes an implicit request to include, with the query, the select data about the particular entity that is other than the one or more users of the client-side assistant device and that is stored in the local storage of the client-side assistant device, transmitting, to the server-side assistant device and for execution, a representation of (i) the query, and (ii) the select data about the particular entity that is other than the one or more users of the client-side assistant device and that is stored in the local storage of the client-side assistant device; and
  - receiving, from the server-side assistant device a response to the query that the server-side assistant device has tailored according to the select data.

16. The system of claim 15, wherein the representation of (i) the query, and (ii) the select data that is stored in the local storage of the client-side assistant device comprises an annotated representation of the query.

17. The system of claim 16, the operations comprising:
- generating, by an on-device query rewrite engine of the client-side assistant device, the annotated representation of the query by generating an annotation that references the select data that is stored in the local storage of the client-side assistant device.

18. The system of claim 15, the operations comprising:
- identifying, based on the query, a reference to the particular entity that is other than the one or more users of the client-side assistant device; and
- selecting a proper subset of facts from among stored data in the local storage of the client-side assistant device.

19. The method of claim 15, wherein the local storage of the client-side assistant device includes a model that, for each of the entities that are other than the one or more users of the client-side assistant device, stores one or more facts that associated with the entity, and
- wherein the select data comprises one or more facts that are associated with a particular entity associated with the query.

20. The method of claim 15, the operations comprising removing, by the mobile computing device, private information associated with the select data that is stored in the local storage of the client-side assistant device prior to the transmission to the server-side assistant device.

* * * * *